FIG. 1

INVENTOR.
T. T. BUNCH
BY A.C. Schwarz, Jr.
ATTORNEY

April 5, 1960  T. T. BUNCH  2,931,595
APPARATUS FOR DISTRIBUTING STRAND MATERIAL
Filed Nov. 28, 1956  7 Sheets-Sheet 2

FIG. 2

INVENTOR.
T. T. BUNCH
BY A.C. Schwarz, Jr.
ATTORNEY

April 5, 1960 T. T. BUNCH 2,931,595
APPARATUS FOR DISTRIBUTING STRAND MATERIAL
Filed Nov. 28, 1956 7 Sheets-Sheet 3

INVENTOR.
T. T. BUNCH
BY A.C. Schwarz, Jr.
ATTORNEY

April 5, 1960  T. T. BUNCH  2,931,595
APPARATUS FOR DISTRIBUTING STRAND MATERIAL
Filed Nov. 28, 1956  7 Sheets-Sheet 4

FIG. 4

INVENTOR.
T. T. BUNCH
BY A.C. Schwarz, Jr.
ATTORNEY

April 5, 1960 T. T. BUNCH 2,931,595
APPARATUS FOR DISTRIBUTING STRAND MATERIAL
Filed Nov. 28, 1956 7 Sheets-Sheet 5

INVENTOR.
T. T. BUNCH
BY
ATTORNEY

FIG. 8

INVENTOR
T. T. BUNCH
BY
H. J. Winegar
ATTORNEY

April 5, 1960     T. T. BUNCH     2,931,595
APPARATUS FOR DISTRIBUTING STRAND MATERIAL
Filed Nov. 28, 1956     7 Sheets-Sheet 7

INVENTOR.
T. T. BUNCH
BY A.C. Schwarz, Jr.
ATTORNEY

United States Patent Office 2,931,595
Patented Apr. 5, 1960

2,931,595

APPARATUS FOR DISTRIBUTING STRAND MATERIAL

Tillman T. Bunch, near Ashland, Md., assignor to Western Electric Company, Incorporated, New York, N.Y., a corporation of New York Application November 28, 1956, Serial No. 624,867

5 Claims. (Cl. 242—158.4)

This invention relates to apparatus for distributing strands, and more particularly to apparatus for uniformly distributing a strand upon the winding surface of a takeup reel as the strand is wound thereon.

In many cases the distribution of the cable in a cable reeling operation must be manually controlled because of the difficulty of otherwise obtaining a uniform distribution of the cable on the reel and obtaining a freedom from objectionable piling up of the cable at the ends of the reel. It has been determined that if a substantially constant wrap angle (i.e. the helix angle) is maintained as the winding proceeds across the winding surface of the reel, then a substantially uniform winding results.

In the case of cables or other strand type material in which the surface conditions of the strands are such as to cause friction or interlocking between the surfaces of adjacent strands, it has been determined that a building up of the strand convolutions can be prevented if the approach angle (i.e. the angle between the straight section of strand approaching the reel and an extended cross sectional plane of the winding reel which is perpendicular to the longitudinal axis of the takeup reel) is maintained above a predetermined value. It has further been determined that in the case of strands having such surface conditions that the wrap angle tends to be substantially equal to the approach angle because of the interlocking or frictional nature of the surfaces which tend to hold the strand in the position of its first contact with the reel.

Conversely, strand material having a slick surface may tend to distribute itself on the reel at a wrap angle or angles not necessarily dependent upon the approach angle to the reel, as is the case where the advance of the convolutions across the drum of the reel is faster than the advance of the distributor and each successive convolution is guided into place by registering against the last preceding convolution.

However, in the case of materials where the wrap angle follows the approach angle assuming that the desired helical winding has been produced by maintaining a correct approach angle for substantially the entire length of the reel, difficulty occurs when the winding operation reaches the flange of the reel or end of a layer.

To avoid disturbed winding at the ends of the reel, the approach angle needs to be established in the opposite direction as quickly as is possible so that winding can proceed smoothly on the new layer. Accordingly, the present invention contemplates means for reversing the approach angle as rapidly as possible after the winding of each layer.

One application of the invention is useful in the manufacture of communication cables wherein a plurality of insulated conductors are twisted together to form a composite multiconductor cable core over which a suitable covering is applied. Such a cable core may be wound on a reel by a flyer, while the reel is reciprocated axially into and out of the flyer to distribute the strand across its winding surface. It is desirable in the operation of such apparatus that the strand be distributed uniformly across the winding surface of the takeup reel and that the strand convolutions be prevented from piling up at the ends of the reel drum. This is accomplished, according to one embodiment of the invention, by accelerating the axial movement of the reel after the winding of each layer until the approach angle has been reversed. Such a procedure is particularly desirable in the situation where the reel is rotating at a high speed so that a slightly eccentric winding would produce great forces tending to pull the reel off its rotational axis.

It is an object of this invention to provide a new and improved strand reeling apparatus.

It is another object of this invention to provide a new and improved apparatus for distributing a strand uniformly across the winding surface of a takeup reel.

It is still another object of this invention to provide apparatus for preventing the strand convolutions from piling up at the ends of the reel drum.

Strand reeling apparatus, which illustrates certain features of the invention, may include a rotatable takeup reel, means for guiding the strand toward the winding surface of said takeup reel, means for causing a relative rotation between said takeup reel and said guide means for winding the strand on said reel, means for causing a relative linear movement between said reel and said guide means at a velocity which maintains a predetermined constant approach angle, means for reversing the approach angle instantaneously for preventing the strand from piling up at the end of the reel, and means for causing a relative linear movement between said reel and said guide at a velocity in a new direction which maintains the approach angle constant in its reversed direction, whereby the strand is distributed uniformly across the reel.

A complete understanding of the invention may be obtained from the following detailed description of apparatus forming specific embodiments of the invention, when read in conjunction with the appended drawings, in which.

Referring now in detail to the drawings, Figs. 1 to 8, inclusive, illustrate a first embodiment of the invention. As viewed in Figs. 1 and 2, a cable core 12 advances from left to right to a takeup unit designated generally by the numeral 20. The unit 20 includes a rotatable takeup reel, designated generally by the numeral 22, on which the cable core 12 is wound in a plurality of layers of helical convolutions back and forth along the length of the reel 22, utilizing the improved distributing apparatus of the invention to provide uniform distribution of the cable core 12 across the winding surface of the reel 22.

Figure 1:
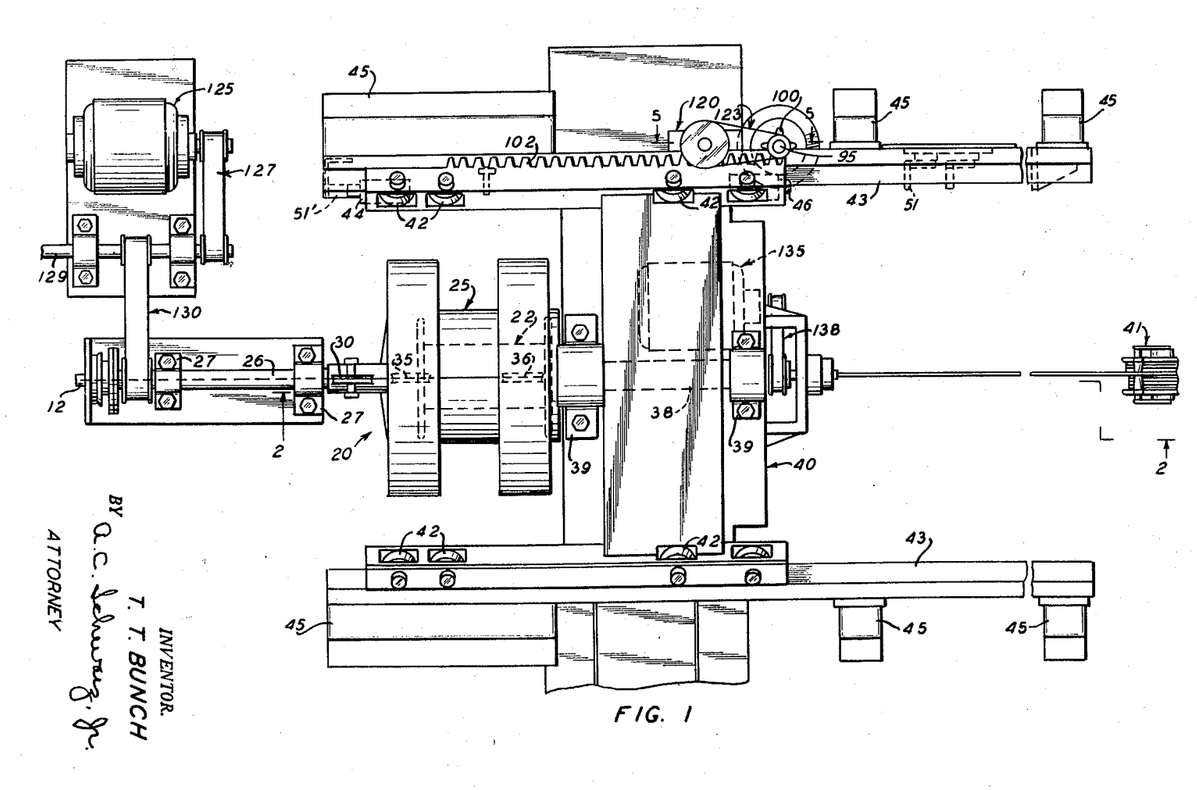
Fig. 1 is a plan view of stranding the reeling apparatus constituting a first embodiment of the invention.
Figure 2:
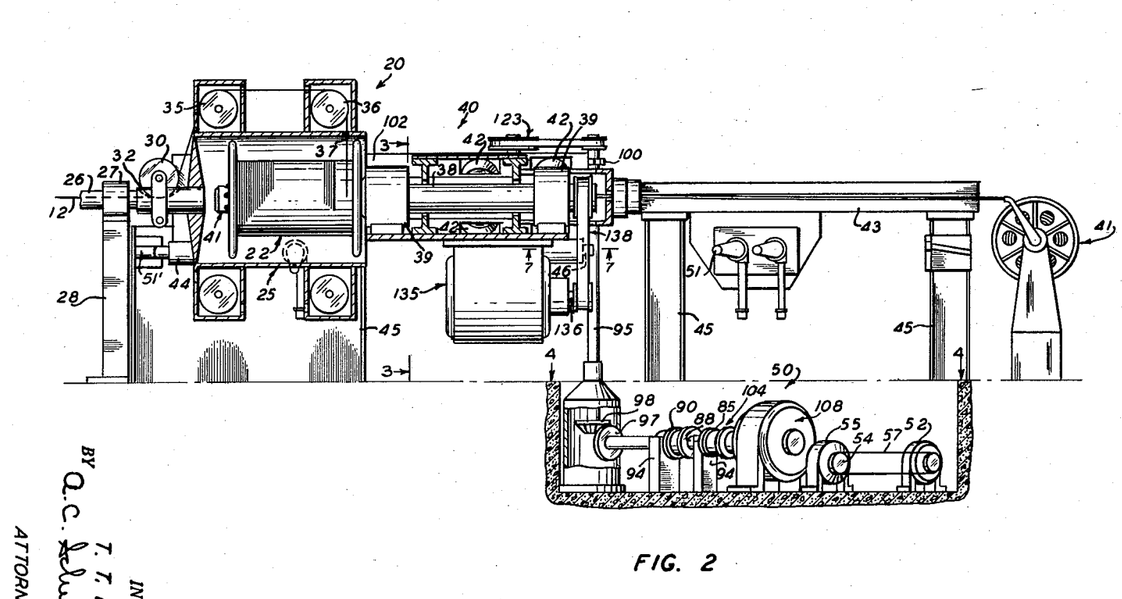
Fig. 2 is a fragmentary, vertical section taken along line 2—2 of Fig. 1, with parts thereof broken away for clarity.
Figure 3:
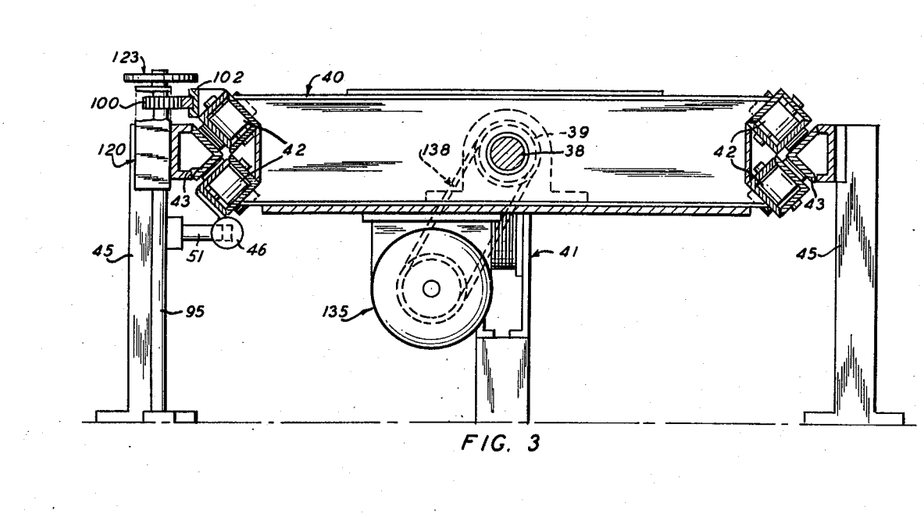
Fig. 3 is a vertical section taken along line 3—3 of Fig. 2, with parts thereof broken away for clarity.

The takeup unit 20 includes a hollow, cup-like flyer 25 which revolves about the reel 22 to wind the cable core 12 thereon. The flyer 25 is mounted fixedly, at its closed end, upon a hollow, rotatable shaft 26 for rotation concentrically about the longitudinally extending, rotational axis of the takeup reel 22. The shaft 26 is supported rotatably by spaced bearing blocks 27—27 mounted on two vertical support columns, one of which designated 28, is shown in Fig. 2. As viewed in Fig. 1, the cable core 12 advances longitudinally from left to right through the hollow shaft 26 to a freely rotatable guide sheave 30 mounted within an arcuate cut-out slot 32 (Fig. 2) formed in the shaft 26. The guide sheave 30 directs the advancing cable core 12 to a pair of longitudinally spaced, freely rotatable guide sheaves 35 and 36 mounted on the outer periphery of the flyer 25. The cable core 12 travels over the guide sheaves 35 and 36 and is then directed radially inwardly, through an aperture 37 (Fig. 2) formed in the flyer 25, to the winding surface of the takeup reel 22.

The takeup reel 22 (Fig. 2) is supported on the free end of a rotatable arbor 38. While the illustrated reel 22 is shown with flanges thereon, it is conceivable that a reel could be used having no flanges thereon. The arbor 38 is mounted rotatably, in cantilever fashion, on spaced bearings 39—39 mounted fixedly on a reciprocable distributor carriage designated generally by the numeral 40. A spring-closed, pneumatically-released latching mechanism 41 is provided for mounting and locking the takeup reel 22 detachably on the arbor 38 for positive rotation therewith. The latching mechanism 41 forms the subject matter of my copending application Serial No. 570,051, filed on March 7, 1956, and will not be described in detail herein. The arbor 38 is aligned axially with the rotational axis of the flyer 25 to position the takeup reel 22 concentrically with respect to the flyer.

The carriage 40 is reciprocated by a drive unit, designated generally by the numeral 50 (Figs. 2 and 4), so as to move the reel 22 into and out of the flyer 25 to distribute the cable core 12 being wound on the reel 22 in a plurality of layers of helical convolutions back and forth across the winding surface of the reel. The drive unit 50 includes means, to be described hereinafter, for accelerating the carriage after each distributing stroke thereof in order to rapidly reverse the approach angle. The distributor carriage 40 is mounted on opposed pairs of rollers 42—42 for longitudinal movement along and between a pair of spaced, triangular section, longitudinally extending tracks 43—43 which are supported horizontally on spaced support columns 45—45.

Figure 7:
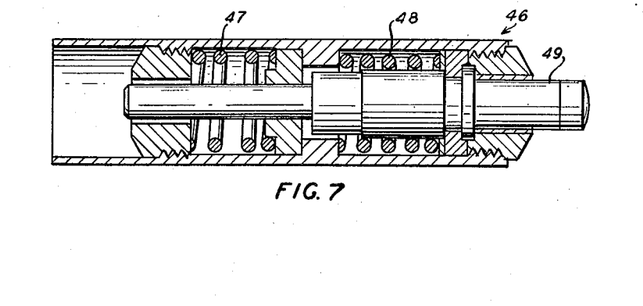
Fig. 7 is an enlarged, horizontal section taken along line 7—7 of Fig. 2.

Rigidly secured at either end of the carriage 40 are identical spring bumpers 44 and 46 (Fig. 2), one of which is shown in enlarged fashion in Fig. 7. The spring bumpers 44 and 46 each have a pair of springs 47 and 48 received therein. The spring 47 acts as a safety device to absorb the kinetic energy of the carriage should the various brakes and motors of the reeling apparatus incorrectly operate so as not to reverse the direction of the carriage 40 after each reciprocating stroke. The spring 48 is depressed by the plunger 49 each time the bumpers 46 and 44 strike forged stop members 51 and 51' (Fig. 2), respectively. The stop members 51 and 51' define generally the limits of traverse of the carriage 40 in the opposite distributing directions, with the springs 48—48 of the bumpers 46 and 44 assisting in the rapid reversal of the traverse and facilitating acceleration in the opposite direction after each strand-distributing stroke.

Figure 4:
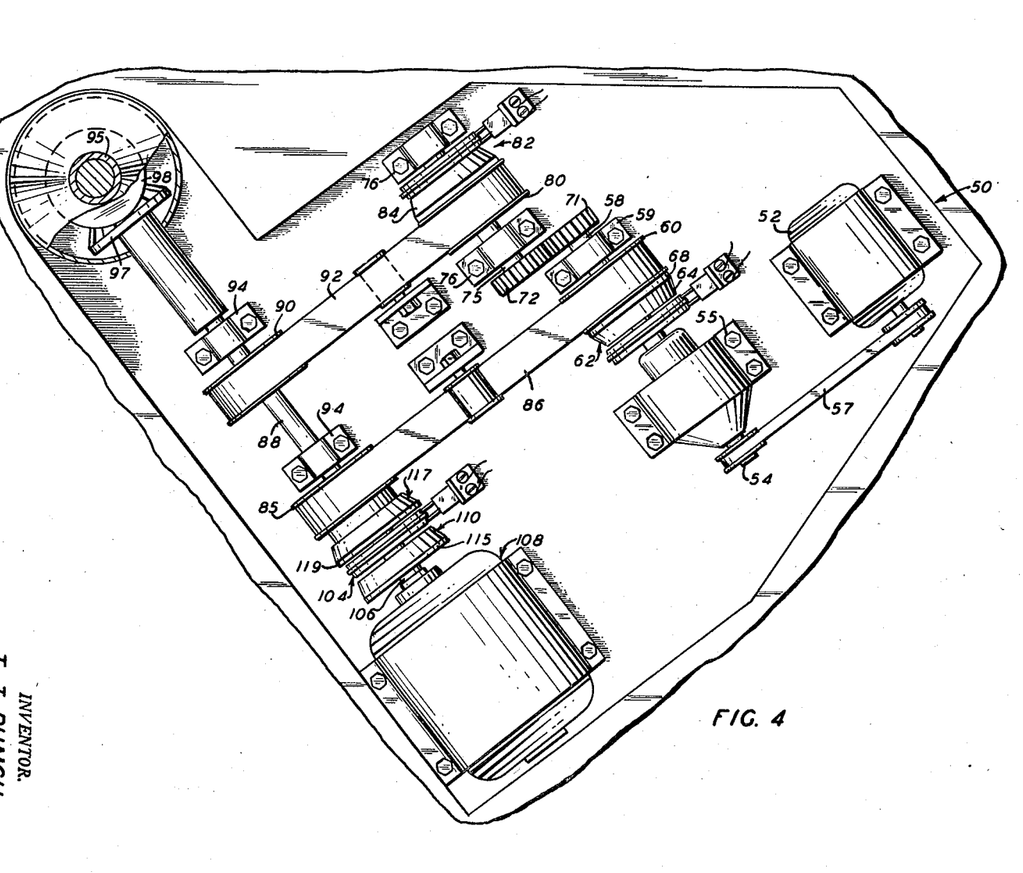
Fig. 4 is an enlarged, horizontal section taken along line 4—4 of Fig. 2.

The distributor drive unit 50 shown in Fig. 4, is designed to drive the distributor carriage 40 reciprocably so as to move the takeup reel 22 axially into and out of the open end of the flyer 25 whereby the convolutions of the cable core 12 are distributed in layers across the winding surface of the takeup reel 22. The distributor drive unit 50 includes a distributor drive motor 52 (Figs. 4 and 8), preferably a variable speed, D.C., shunt wound motor, which is connected to an input shaft 54 of a gear reducer 55 by a non-slip, zero backlash, drive belt 57.

The motor 52 is sequentially connected to drive the carriage 40 in opposite directions and is operatively connected during the major portion of each cycle to reciprocate the carriage 40 at normal distributing speeds, which decrease proportionally with the increase in winding radius of the reel 22 to maintain a substantially constant approach angle of the cable core 12 to the reel 22 during each stroke of the carriage. The speed control circuit for the motor 52 will be described in detail hereinafter. An output shaft 58 of the gear reducer 55 is supported rotatably in a bearing 59 and is provided with a pulley 60, which is either freely rotatable upon the output shaft 58 or may be connected operatively thereto for rotation therewith by means of an electromagnetic clutch 62, such as a type 825 Warner Electric clutch manufactured by Warner Electric Brake & Clutch Co., Beloit, Wisconsin. The clutch 62 is energized for almost one-half of each cycle and is designed to connect the motor 52 so as to move the carriage 40 and reel 22 in a forward direction, from right to left as viewed in Figs. 1 and 2, to distribute the cable core 12 on the reel 22.

The clutch 62 is provided with an electromagnet assembly 64 which is keyed to the output shaft 58 and may be energized to cause engagement with a paramagnetic clutch disc 68 mounted directly to the pulley 60 for rotation therewith. Thus, when the clutch 62 is actuated, the pulley 60 is driven rotatably from the output shaft 58. The output shaft 58 is connected by means of intermeshing gears 71 and 72 to drive a shaft 75 supported rotatably at its opposite ends in bearings 76—76. A pulley 80 is positioned on the shaft 75 and is either freely rotatable thereupon or may be connected selectively for rotation with the shaft by means of an electromagnetic clutch 82 having an electromagnet assembly 84, which is substantially identical to the assembly 64 of the electromagnetic clutch 62 hereinabove described. The clutch 82 is also energized for nearly one-half of each cycle (at which times the clutch 62 is de-energized) and is designed to connect the motor 52 so as to move the carriage 40 and reel 22 in a reverse direction, from left to right as viewed in Figs. 1 and 2.

The pulley 60, when connected operatively to the output shaft 58 through its associated electromagnetic clutch 62, drives a pulley 85 through a non-slip, zero backlash, drive belt 86. The pulley 85 is keyed to a drive shaft 88 so that, when the pulley 60 is driven from the output shaft 58, the drive shaft 88 is driven in a forward, counterclockwise direction, as viewed in Fig. 2. When the pulley 80 is connected operatively to the shaft 75 by means of its associated electromagnetic clutch 82, a pulley 90 keyed to the drive shaft 88 is driven rotatably through a non-slip, zero backlash, drive belt 92. Since the intermeshing gears 71 and 72 (Fig. 4) reverse the rotation of the shaft 75 with respect to the rotation of the output shaft 58, the drive shaft 88 rotates in the reverse, clockwise direcion, as viewed in Fig. 2, when the electromagnetic clutch 82 is actuated and the clutch 62 is not operated.

As shown in Fig. 4, the drive shaft 88 is mounted rotatably in a horizontal position on bearings 94—94 and one end thereof is connected to the lower end of a vertically extending distributor drive shaft 95 by means of intermeshing bevel gears 97 and 98. The upper end of the distributor drive shaft 95 is provided with a pinion gear 100 (Figs. 1, 3 and 5) which is positioned in intermeshing engagement with a horizontally extending, toothed rack 102 secured fixedly to the adjacent side of the movable distributor carriage 40 whereby rotation of the distributor drive shaft 95 in either direction causes corresponding longitudinal movement of the distributor carriage 40 along the tracks 43—43 to move the takeup reel 22 axially into and out of the flyer 25.

At certain prescribed intervals, for a short time after the end of each strand-distributing stroke of the carriage 40, the clutches 62 and 82 are both de-energized and the drive shaft 88 (Fig. 4) is connected through an electromagnetic clutch unit 110 of a clutch-brake coupling 104, such as a type 825 Warner Electric clutch-brake coupling, manufactured by the Warner Electric Brake & Clutch Company, to an output shaft 106 of a reversible booster motor 108. The booster motor 108 operates at a much higher speed than the motor 52 and is alternately energized to rotate in opposite directions so as to move the carriage 40 in the direction opposite to that of the previous strand-distributing stroke at an accelerated rate in order to rapidly reverse the approach angle after each stroke. The clutch 110 is similar to the clutches 62 and 82, and is keyed to the end of the drive shaft 88. When the electromagnetic clutch 110 is energized, an associated paramagnetic clutch disc 115, which is keyed to the output shaft 106 of the booster motor 108 engages the drive shaft 88 with the output shaft 106 of the booster motor. The clutch-brake unit 104 also includes a stationary electromagnetic brake 117 associated with a paramagnetic brake disc 119 which is keyed to the drive shaft 88. When the electromagnetic brake 117 is energized it engages the brake disc 119 to brake the drive shaft 88. The brake 117 will not be further described, since it is energized only after each full cycle of operation to stop the distributing apparatus while an empty reel is being substituted for a full reel.

The sequential operation of the electromagnetic clutches 62, 82 and 110 and the alternate energization of the booster motor 108 are controlled by a cam type, switching or timing unit, indicated generally at 120 (Figs. 1 and 5), which is provided with a cam shaft 122 which is driven from the distributor drive shaft 95 through a non-slip belt and pulley transmission 123. The switching unit 120 controls the cycle of operation of the electrical control circuit, shown schematically in Fig. 8.

Figure 8:
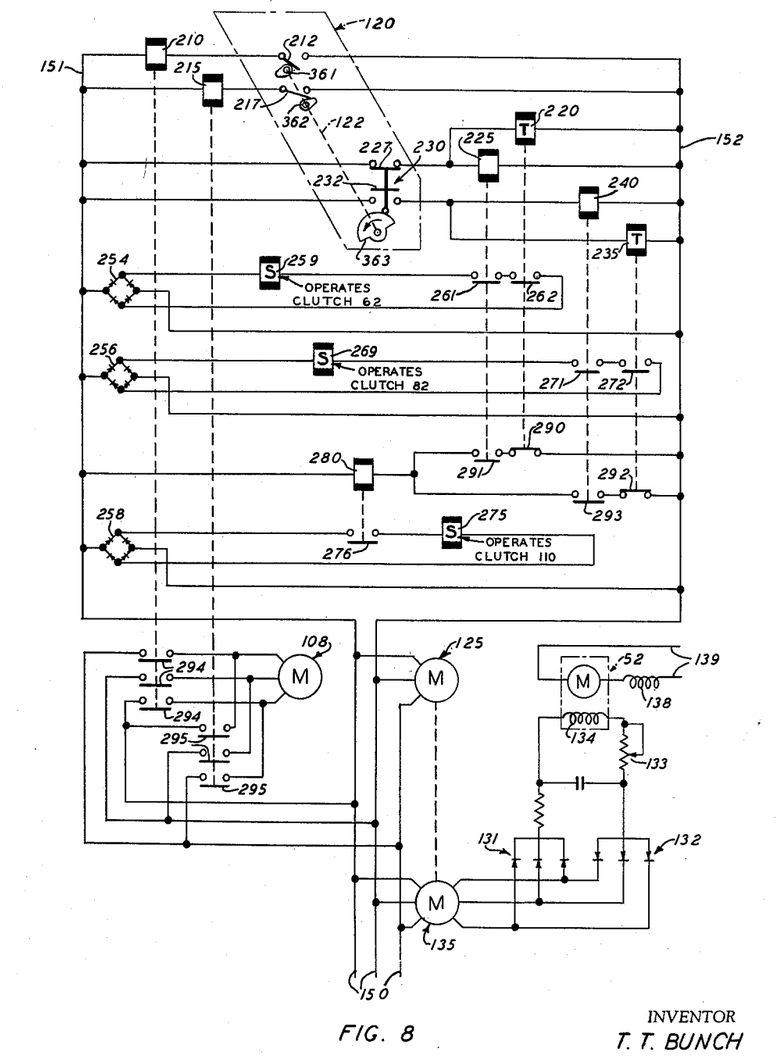
Fig. 8 is a schematic representation of an electromechanical control circuit forming a part of the stranding apparatus shown in Figs. 1 to 7, inclusive.

Throughout the operation of the stranding apparatus, the takeup reel 22 is rotated by the flyer 25 through the pull of a portion of the cable core 12 extending from the flyer 25 to the winding surface of the takeup reel. The flyer 25 is driven continuously at a predetermined speed by a main drive motor 125 (Figs. 1 and 8). The main drive motor 125 is connected by means of a pulley and belt transmission 127 to a longitudinally extending, rotatable, shaft 129 which, in turn, is connected by means of a pulley and belt transmission 130 to the flyer supporting shaft 26.

An induction machine 135 (Figs. 1, 2 and 8) is mounted to the underside of the distributor carriage 40 and is provided with an output shaft 136, which is connected operatively to the arbor 38 through a toothed, non-slip belt transmission 138. The induction machine 135 is designed to apply a braking torque to the arbor 38, as the cable core 12 is reeled upon the takeup reel, such that a substantially constant tension is maintained in the cable core during an entire operation from an empty reel condition to a full reel condition. The braking apparatus utilizing the induction machine 135 forms the subject matter of my copending application Serial No. 624,873, filed on November 28, 1956, and will not be described in detail herein except for the manner to be described hereinafter in which the machine 135 controls the speed of the distributor motor 52.

In starting up, an empty reel 22 is loaded on the arbor 38 in the manner disclosed in my related copending application Serial No. 650,961, filed on April 5, 1957, now Patent 2,899,142, and is latched in place on the arbor 38 in the manner described in my earlier-mentioned copending application Serial No. 570,051. The start-up apparatus and circuitry are described in detail in my copending application Serial Nos. 624,873 and 650,961.

After the start-up operation, as viewed in Fig. 8, the flyer motor 125 and the induction machine 135 are energized from three-phase, A.C. bus lines 150—150 so that the flyer 25 operates to wind the cable core 12 on the reel 22. The induction machine 135 operates, as described in my copending application Serial No. 624,873, to apply a braking torque to the arbor 38 so that a constant tension is maintained in the cable core 12 during the entire takeup operation.

As previously mentioned, and as indicated diagrammatically in Fig. 8, the distributor drive motor 52 is a shunt wound D.C. machine, which in normal operation has its shunt field winding 134 excited by a rectified D.C. voltage supplied from and proportional to the secondary circuit voltage of the induction machine 135. As shown in Fig. 8, the shunt field winding 134 of the motor 52 is connected to the three phases of the secondary circuit of the induction machine 135 through three-phase rectifier units 131 and 132, in series with an adjustable resistor 133. The armature circuit of the motor 52 includes a small series compensating winding 138 and is energized from suitable D.C. supply lines 139—139.

The motor 52 runs at all times, and is alternately connected through the clutches 62 and 82 during the major portion of each cycle to reciprocate the carriage 40; however, the speed of the motor 52 during a takeup operation varies as determined by the secondary of the induction machine 135. When the takeup reel 22 is empty, the induction machine 135 is driven at a relatively low speed above its synchronous speed because of the relatively small winding radius. Under these conditions the distributor carriage 40 must travel relatively fast to distribute the cable core 12 uniformly upon the winding surface of the takeup reel 22. As the layers of convolutions build up and the winding radius of the takeup reel 22 increases, the rotational speed of the takeup reel increases proportionally and thus drives the induction machine 135 at proportionally higher speeds. Consequently, as the winding radius increases the distribution carriage speed 40 must decrease proportionally.

Because of the fact that the shunt-field winding 134 of the distributor motor 52 is excited from the secondary circuit of the induction machine 135, the required proportional decrease in speed of the distributor carriage 40 is achieved thereby. With the speed of the induction machine 135 becoming proportionally greater above its synchronous speed, as the winding radius increases, the slip of the induction machine increases to increase the secondary voltage thereof proportionally. This proportional increase in the secondary voltage of the induction machine 135 results in a proportionally greater rectified current passing through the shunt-field winding 134 of the distributor motor 52. Consequently, the speed of the distributor drive motor 52 decreases proportionally with the increase in the winding radius of the takeup reel 22 to effect the uniform distribution of the convolutions of the cable core 12 upon its winding surface.

Figure 5:
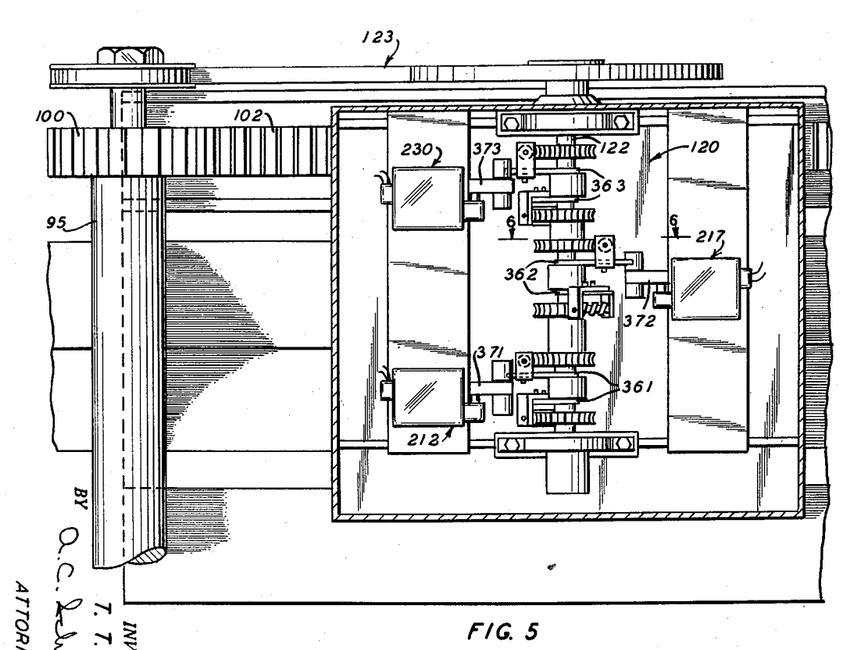
Fig. 5 is an enlarged, fragmentary, vertical section taken along line 5—5 of Fig. 1, with parts thereof broken away for clarity.
Figure 6:
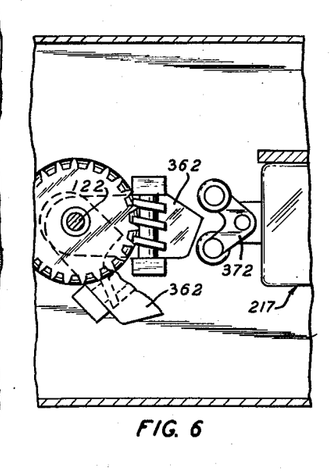
Fig. 6 is an enlarged, fragmentary, horizontal section taken along line 6—6 of Fig. 5, with parts broken away for clarity.

Referring to Figs. 5, 6 and 8, the switching unit 120 includes three cam-operated switches 212, 217 and 230, with the switch 230 including an upper contact 227 and a lower contact 232. The switches 212, 217 and 230 control the cycle of operation, and are themselves operated in accordance with the movements of the distributor carriage 40. As mentioned previously the cam shaft 122, which forms a part of the switching unit 120, is driven from the distributor drive shaft 95. Adjustably mounted on the cam shaft 122 are a plurality of pairs of cams 361—361, 362—362 and 363—363 designed to strike

*Control circuit and operation of the first embodiment*

Considering now the operation of the first embodiment of the invention in connection with the switching unit illustrated in Figs. 5 and 6 and the control circuit illustrated in Fig. 8, it will be assumed that the apparatus has previously been started up and is now at operating speed.

and throw operating levers 371, 372 and 373, respectively, of the switches 212, 217 and 230, respectively, at predetermined positions of the cam shaft 122. The switches 212, 217 and 230 are of the "Snap-Lock" type, manufactured by the National Acme Co. of Cleveland, Ohio, which, when thrown in one direction, remain in that position until thrown in the opposite direction to the other position. The cams 361—361, 362—362, and 363—363 are shown in simplified form in Fig. 8 for illustrative purposes only.

The switch 212 is actuated and closed, to start the booster motor 108 running in a reverse direction, by one of the pair of cams 361—361 as the distributor carriage 40 nears the end of its forward traverse and is actuated and reopened again, to disconnect the booster motor 108, by the other cam 361 after the distributor carriage is moving in the reverse direction solely under power from the distributor motor 52. The switch 217 is actuated and closed, to start the boostor motor 108 running in a forward direction, by one of the pair of cams 362—362 as the distributor carriage 40 nears the end of its reverse traverse and is opened again to disconnect the booster motor 108, by the other cam 362 after the distributor carriage is moving in its normal fashion in the forward direction solely under power from the distributor motor 52. The switch 230 is actuated by one of the pair of cams 363—363 to open its contact 227 and to close its contact 232, at once to energize the clutch 110 and after a predetermined time delay to de-energize the clutch 110 and energize the clutch 82, when the distributor carriage 40 reaches the limit of its forward traverse. Subsequently, the switch 230 is actuated by the other cam 363 to reclose its contact 227 and to reopen its contact 232, at once to energize the clutch 110 and after a predetermined time delay to de-energize the clutch 110 and energize the clutch 62, when the distributor carriage reaches the limit of its reverse traverse.

Assuming that the cycle has started and has been brought to an initial state where the distributor carriage 40 is moving forward under the influence of the motor 52 to move the takeup reel 22 into the flyer 25 (i.e. moving to the left as viewed in Fig. 2), an associated pair of control relays 220 and 225, the relay 220 being a time-delay relay, are energized across a pair of single-phase, A.C. supply conductors 151 and 152. Accordingly, first contacts 262 and 261, respectively, of the relays 220 and 225 are closed so that a solenoid 259 forming a part of the electromagnetic clutch 62 (Fig. 4) is energized across the supply conductors 151 and 152 through a rectifier 254 and, with the clutch 62 operative, the drive belt 86 is driven from the distributor drive motor 52 to move the distributor carriage 40 in its forward direction.

As the distributor carriage 40 nears the limit of its forward traverse, the cam shaft 122 (Fig. 5) of the timing unit 120 reaches a position in which one of the cams 362—362 actuates the switch 217 to its closed position to energize a control relay 215. The relay 215 closes its contacts 295—295 to energize the booster motor 108 in a reverse direction; i.e., the direction which will move the carriage 40 and reel 22 from right to left as viewed in Figs. 1 and 2. The booster motor 108 at this time is not connected to the drive shaft 88 and accelerates rapidly to its normal operating speed in the reverse direction. The motor 108 is fully accelerated by the time the distributor carriages 40 reaches a position whereat the stop member 51' abuts but does not depress the spring bumper 44.

Simultaneously with the carriage reaching that position, the cam shaft 122 of the timing unit 120 reaches a predetermined position wherein one of the cams 363—363 opens the contact 227 of the switch 230 and closes the contact 232. As the contact 227 opens, the relays 220 and 225 are de-energized and the contact 261 of the relay 225 opens instantaneously to de-energize the solenoid 259 of the electromagnetic clutch 62 so that the drive belt 86 is disconnected from the distributor drive motor 52 and the distributor carriage 40 is no longer driven in a forward direction. As the contact 232 closes, a second associated pair of control relays 235 and 240 are energized, the relay 235 being a time-delay relay similar in operation to the relay 220. The relay 240 immediately closes first and second contacts 271 and 293 thereof. Since the relay 235 is a time-delay relay, a first contact 272 thereof remains open for a predetermined time interval and a second, normally-closed contact 292 remains closed during the time interval.

During the time interval that the contacts 292 and 293 are both closed, a relay 280 is energized to close a contact 276 thereof, so as to energize a solenoid 275 of the clutch 110 for the booster motor 108 across the lines 151 and 152 through a rectifier 258.

Accordingly, the drive shaft 88 is connected immediately to the booster motor 108 which is now running at full speed in its reverse direction. The booster motor 108 is connected to the distributor carriage 40 through its clutch 110 in such a manner that, assuming no slip in the clutch 110, the carriage will move at a markedly greater speed than when under the drive of the motor 52. Also, the clutch 110 is designed so that within a short period of time after the energization of the solenoid 225 a positive connection is achieved between the driving and driven members.

The inertia of the carriage 40 tends to maintain the velocity of the carriage opposite to the direction in which the motor 108 is tending to drive it. However, after the spring bumper 44 has contacted the fixed stop 51', the increasing force produced by the depression of the spring 48 in combination with the force developed by the motor 108 causes a rapid deceleration of the carriage 40 until the velocity of the carriage is zero. The continuing force of the booster motor 108 aided by the release of the energy stored in the spring 48 maintains a high acceleration of the carriage in the reverse direction and brings the carriage to a high velocity in the reverse direction, whereby the approach angle is reversed in a fraction of the time of one revolution of the reel 22. Because of the fact that the approach angle is to be reversed very rapidly, the carriage 40 will attain a greater velocity while driven by the booster motor 108 than its usual distributing speed.

The booster motor 108 is connected to the drive shaft 88 for only the relatively short period of time required to rapidly reverse the approach angle and is then disconnected by the opening of the contact 292 of the previously energized time delay relay 235. Simultaneously, at the end of this time delay interval, the contact 272 of the time delay relay 235 closes and, through the already closed contact 271 of the relay 240, energizes a solenoid 269 of the electromagnetic clutch 82 through a rectifier 256. The clutch 82 connects the drive shaft 88 to the distributor drive motor 52 through the belt 92 whereupon the carriage 40 continues its movement in the reverse direction powered from the distributor drive motor 52, at a speed inversely proportional to the winding radius of the takeup reel 22. Subsequently the other cam 362 trips the operating lever 372 (Fig. 6) to reopen the switch 217 and de-energize the booster motor 108.

When the distributor carriage 40 nears the limit of its reverse traverse, one of the cams 361—361 operates the switch 212 to its closed position to energize a relay 210, which closes contacts 294—294 thereof to energize the booster motor 108 in its forward direction. Thereupon the booster motor 108 starts up and is fully accelerated by the time the distributor carriage 40 reaches a position whereat the stop member 51 abuts but does not depress the spring bumper 46. When the distributor carriage 40 reaches a position whereat the stop member 51 abuts but does not depress the spring bumper 46, the switch 230 is operated by the other of the cams 363—363 to close its contact 227 and open its contact 232.

Immediately upon the opening of the contact 232, the relays 235 and 240 are de-energized, and the contact 271 of the relay 240 opens to de-energize the solenoid 269 of the clutch 82 and disconnect the motor 52 from the drive shaft 88. As the contact 227 again closes, the time-delay relay 220 and the relay 225 are again energized. The relay 225 immediately closes the first contact 261 thereof, previously mentioned, and also closes a second contact 291 thereof. Since the relay 220 is a time-delay relay, the first contact 262 thereof remains open for a predetermined time interval and a second, normally-closed contact 290 thereof remains closed during the time interval.

During the short predetermined time that the contacts 290 and 291 are both closed, the relay 280 is again energized to close its contact 276 and energize the solenoid 275 of the booster-motor clutch 110. It should be noted that clutch 110 is alternately operated for short intervals immediately after the change of state of the switch 230 by means of the parallel construction of the contacts groups 290—291 and 292—293 and by the time-delay interval of the relays 220 and 235. As the clutch 110 is operated, the now forward-running booster motor 108 is connected to the drive shaft 88 so as to reverse the approach angle of the cable core 12 rapidly with the aid of the spring bumper 46 in the manner hereinabove described.

At the end of the short time delay the contact 290 of the time delay relay 220 reopens and its contact 262 closes, whereby the booster motor 108 is disconnected from the drive shaft 88 and the drive shaft is connected to the distributor drive motor 52 through the drive belt 86 so that the distributor carriage 40 continues its movement in the forward direction powered by the distributor drive motor. Subsequently the switch 212 is reopened by the other of the cams 361—361 to de-energize the booster motor 108. This completes one full cycle of operation and returns the control circuit to the initial state described hereinbefore. When the reel 22 becomes full, the takeup operation is stopped and the reel is unloaded from the arbor 38 as described in my copending application Serial No. 650,961, now Patent 2,899,142.

The above-described distributing device, as used in conjunction with the particular stranding machine shown, forms only one embodiment of the invention. The invention is concerned primarily with preventing a piling up of the convolutions of strands at the end of the winding surface of the reel and performs this function by reversing rapidly the approach angle of the strand at the end of the reel. Theoretically the wrap angle and, therefore, the approach angle should be reversed instantaneously at the exact instant the strand winding has proceeded as far on the reel as is desired.

Assuming that the surface conditions of the strand are such as to cause a certain amount of friction between the strands as they are moved against each other, the result of such instantaneous reversal would be a second winding layer on the reel in the oppoiste direction of substantially the same desirable uniformity as the first layer with no piling up of the strand. While to reverse the approach angle instantaneously would involve an impossible infinite relative acceleration between the reel and the flyer, satisfactory results can be realized at achievable relative acceleration. However, for this the approach angle must be established much more promptly than presently is done in the winding art. Rather than just reversing the longitudinal velocity of the reel with respect to the flyer and allowing the reverse approach angle to establish itself by hunting, the reverse approach angle may only be established soon enough for good results by accelerating the reel in the reverse longitudinal direction until the reverse angle has been established and then reducing the velocity to that normally required to maintain the newly established angle.

Alternative embodiments

While one preferred form of the apparatus embodying the invention has been hereinabove shown and described, it is to be noted that the principles of the invention may be employed in a broader manner. An alternative to this preferred form of the invention might be moving the flyer longitudinally instead of the reel. Another alternative might be replacing the flyer of the preferred embodiment with a stationary guide. Still another might be replacing the flyer with a non-rotatable, longitudinally movable guide and replacing the longitudinally movable and rotatable reel with a rotatable reel. A specific apparatus of this type is disclosed in the related, co-pending application of D. C. Frate, Serial No. 624,936, entitled "Strand Distributing Apparatus," filed on even date herewith.

Figure 9:
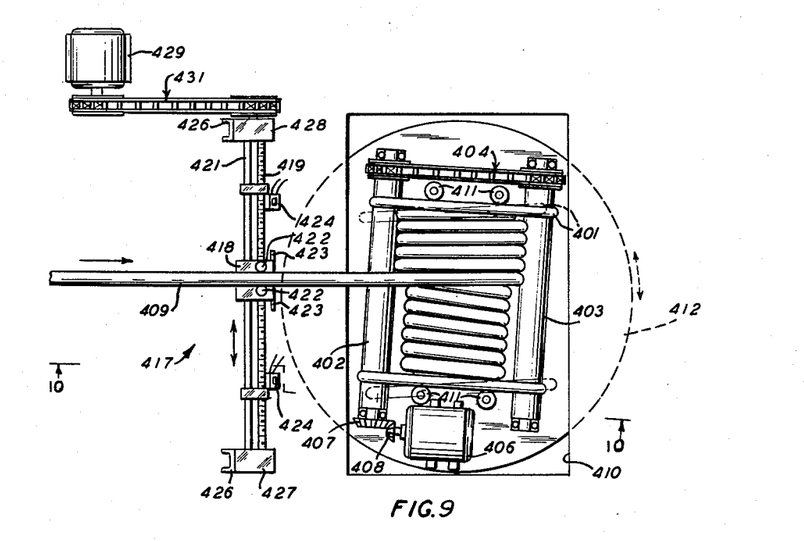
Fig. 9 is a plan view of a takeup apparatus forming an alternative embodiment of the invention.
Figure 10:
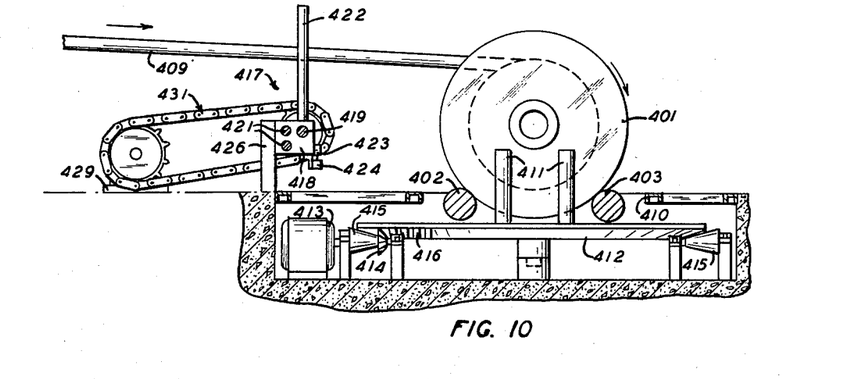
Fig. 10 is a vertical section taken along line 10—10 of Fig. 9, with certain portions omitted for clarity.

An alternative within the scope of the invention which perhaps is not quite as obvious from the above discussion as the before-mentioned alternatives is shown in Figs. 9 and 10. Referring to those figures, a reel 401 is shown resting on a pair of drive rollers 402 and 403 which are connected by means of a chain and sprocket transmission 404 and are driven by a motor 406 connected to the drive roller 402 by means of bevel gears 407 and 408, whereby the reel 401 is rotated so as to wind a strand 409 thereon.

As shown in Fig. 9, an aperture 410 in the factory floor partially conceals a flat member or turntable 412 which has rotatably mounted upon it the drive rollers 402 and 403 and rollers 411—411 which serve to hold the reel 401 in position as the reeling proceeds. The motor 406 is rigidly mounted upon the turntable 412, which is of circular shape as shown in Fig. 9 and is pivotable about an axis perpendicular to the plane of the circle and through the center of the circle. The turntable 412 may be pivoted through a predetermined angle in a brief period by a second motor 413, which is connected to the turntable 412 by a bevel gear 414 meshing with a geared portion 416 of the turntable 412. The turntable 412 is supported by the gear 414 and by a number of rollers 415—415, which are spaced around the periphery of the turntable 412.

A distributor of somewhat conventional design is indicated generally at 417 and comprises a carriage 418 received around a screw 419 and guide bars 421—421 for reciprocation by the rotation of the screw 419. The carriage 418 has mounted upon it a pair of rollers 422—422 and a pair of microswitch actuators 423—423. Rigidly mounted upon the guide bars 421—421 are a pair of "micro switches" 424—424. Channels 426—426 have rigidly secured to them blocks 427 and 428 to which are rigidly secured the guide bars 421—421. The screw 419 is rotatably mounted within the blocks 427 and 428 but extends through block 428 so as to be driven by a motor 429 through chain and sprocket transmission 431.

To operate the reeling apparatus, the strand 409 is attached to the winding surface of the reel 401 and is wound on the reel 401 by the driving action of the motor 406. The strand is distributed uniformly across the reel as the winding proceeds by the action of the distributor 417. The carriage 418 is moved uniformly at a constant velocity upon the guide bars 421—421 and screw 419 by the motor 429 through the transmission 431 and the screw 419 which moves the carriage 418 longitudinally of the screw 419.

A desired constant approach angle is produced by the constant speed of the carriage 418 and associated rollers 422 which guide the strand to the reel 401. As can be observed in Fig. 9 the reel is at an angle to the path of the carriage 418 substantially equal to the approach angle and retains this position until the carriage 418 moves to a position where the "micro switch" 424 at the bottom of Fig. 9 is actuated by the actuator 423. At this time the turntable 412 is pivoted by the motor 413 which is actuated by the "micro switch" 424 so as to pivot the reel 401 through the above-mentioned angle to a position where the reel 401 forms an equal and opposite angle with the before mentioned path of the carriage 418, said position being indicated by the phantom lines representing the flanges of the reel 401 as shown in Fig. 9.

The motor 429 is reversed simultaneously by the action of the "micro switch" 424 so as to reverse the rotation of the screw 419 and reverse the direction of movement of the carriage 418. The pivoting of the reel 401 and the reversal of direction of movement of the carriage 418 are preset to occur at the instant the wound strand reaches the end of the reel 401. The pivoting of the turntable 412 serves to rapidly reverse the approach angle of the strand so as to prevent a piling up at the end of the reel. The carriage 418, having been reversed in direction of movement by the reversal of the motor 429, continues to move towards the top of Fig. 9 at a constant velocity so as to maintain the approach angle at its reversed value and wind the strand 409 uniformly on the reel 401.

When the upper actuator 423 reaches the "micro switch" 424 at the top of Fig. 9, another reversal of the rotation of the screw 419 and pivoting of the reel 401 occurs so as to again reverse the approach angle rapidly in a similar manner to that above-described. In such a manner a plurality of layers of strand convolutions are uniformly wound upon the reel 401 until the reel 401 has been filled at which time it is removed from the apparatus and replaced by an empty reel.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Strand reeling apparatus, comprising a takeup reel, a guide, means for causing a relative rotation between said takeup reel and said guide to wind a strand on said reel, a variable speed, shunt wound, direct current motor, means for applying a voltage which is inversely proportional to the relative rotational speed between said reel and said guide across the shunt field of said direct current motor so that the speed of said direct current motor is inversely proportional to the winding radius of said reel, means for connecting said direct current motor operatively to said reel to move said reel longitudinally with respect to said guide, a second motor, and control means for accelerating said second motor to operating speed, for disconnecting said direct current motor as the winding nears the ends of said reel, and, simultaneously with the disconnecting, for connecting said second motor operatively to said takeup reel to reverse suddenly the longitudinal movement of said reel, said second motor being designed for moving said reel longitudinally at such a faster rate than said direct current motor that the strand is prevented from piling up at the ends of the reel and is distributed uniformly thereon.

2. A traversing distributor for strand material being wound on a takeup member, comprising a movable distributor carriage, distributor drive motor means normally connected for driving said distributor reciprocably to distribute the strand material back and forth across the winding surface of the takeup member in a plurality of strand-distributing strokes, booster motor means designed to be connected for driving said carriage at an accelerated rate, and control means, operable upon the completion of each strand-distributing stroke, for disconnecting said distributor drive motor means and for connecting said booster motor means to drive said carriage at an accelerated rate in the opposite direction to rapidly reverse the angle of approach of the strand to the takeup member, said control means also being operable upon the completion of each reversal of the approach angle, for disconnecting said booster motor means and for reconnecting said distributor drive motor means to drive said carriage in the opposite direction.

3. Apparatus for distributing strand material being wound from a strand guide onto the winding surface of a takeup reel, comprising a takeup reel, a strand guide, a movable distributor carriage for causing relative movement between the strand guide and the takeup reel, a rotatable shaft for moving said carriage to distribute the strand, a distributor drive motor, means for connecting said distributor drive motor to said shaft at preselected intervals for driving said carriage in a first strand-distributing direction, means for connecting said distributor drive motor to said shaft at other preselected intervals for driving said carriage in the opposite strand-distributing direction, a reversible booster motor for driving said shaft at an accelerated rate to move said carriage rapidly in either strand-distributing direction, and control means, operable upon the completion of each strand-distributing stroke of said distributor carriage, for simultaneously disconnecting the distributor drive motor from said shaft and for connecting said booster motor to said shaft to drive said shaft in the opposite direction at the accelerated rate to rapidly reverse the angle of approach of the strand to the takeup reel, said control means being also operable upon the completion of each reversal of the approach angle, for disconnecting said booster motor from said shaft and for reconnecting said distributor drive motor to said shaft for driving said carriage in the opposite direction.

4. The apparatus defined in claim 3, wherein said control means includes two pairs of control relays, each pair including one quick-acting relay and one time-delay relay; a pair of switch contacts, one of which is designed for energizing both relays of one pair and the other of which is designed for energizing both relays of the other pair; and means for reversing the positions of said switch contacts to reverse the energization status of said relay pairs each time the carriage completes a stroke; the quick-acting relays having contacts so constructed and arranged that, as the carriage completes a stroke, a first contact of the now de-energized, quick-acting relay opens to disconnect the distributor drive motor from the shaft and a first contact of the now-energized, quick-acting relay closes to connect the booster motor to the shaft, the time-delay relays having contacts so constructed and arranged that, after a predetermined time interval during which the booster motor operates to reverse the approach angle, a first contact of the now-energized, time-delay relay opens to disconnect the booster motor from the shaft and a second contact of that relay closes to connect the distributor drive motor to the shaft for driving the carriage in the opposite direction.

5. Apparatus for distributing strand material being wound from a strand guide onto the winding surface of a takeup reel, which comprises: a strand guide, a takeup reel, a reciprocable distributor carriage designed for causing relative linear movement between the guide and the reel; forward and rear fixed stops defining limits for reciprocation of said carriage; forward and rear spring bumpers mounted on said carriage and designed for engaging associated ones of said stops alternately as said carriage reaches its limits of reciprocation; a drive shaft for said carriage; a distributor drive motor designed for driving said carriage at relatively slow speeds so that a predetermined approach angle is maintained between the strand and the reel; a first clutch, designed for connecting said distributor drive motor to said shaft so as to drive said carriage in a forward direction; first switching means for energizing said first clutch so that said carriage travels forward; a reversible booster motor for driving said shaft in either direction at an accelerated rate with respect to the speed of said distributor drive motor; second switching means, operable a predetermined time before the completion of the forward stroke, for energizing said booster motor in the reverse direction; a second clutch, designed for connecting said booster motor to said shaft; third switching means, operable at the end of the forward stroke as the forward spring bumper engages the forward stop, for de-energizing said first clutch and for energizing said second clutch so that said booster motor drives said carriage in the reverse direction at an accelerated rate; a third clutch, designed for connecting said distributor drive motor to said shaft so as to drive said carriage in the reverse direction; fourth switching means, operable after a predetermined time delay set so that the angle of approach of the strand to the reel has been reversed by said booster motor, for de-energizing said second clutch and for energizing said third clutch, said second switching means being operable after the operation of said fourth switching means to de-energize said booster motor; fifth switching means, operable a predetermined time before the completion of the reverse stroke, for energizing said booster motor in the forward direction; sixth switching means, operable at the end of the reverse stroke as the rear spring bumper engages the rear stop, for de-energizing said third clutch and for energizing said second clutch so that said booster motor drives said carriage in the forward direction at an accelerated rate; and seventh switching means, operable after a predetermined time delay set so that the approach angle has again been reversed by said booster motor, for de-energizing said second clutch and for re-energizing said first clutch, said fifth switching means being operable after the operation of said seventh switching means to de-energize said booster motor, said spring bumpers operating in combination with said booster motor to cause a rapid reversal of the approach angle at the end of each stroke of said carriage to provide uniform winding.

References Cited in the file of this patent

UNITED STATES PATENTS

| | | |
|---|---|---|
| 1,105,453 | Petersen | July 28, 1914 |
| 2,458,065 | Farrar | Jan. 4, 1949 |
| 2,539,667 | King | Jan. 30, 1951 |
| 2,600,558 | Mauborgne | June 17, 1952 |
| 2,608,354 | Whittaker | Aug. 26, 1952 |
| 2,613,039 | Holcomb | Oct. 7, 1952 |